United States Patent

[11] 3,566,033

[72] Inventor Robert Eric Young
Leamington Spa, England

[21] Appl. No. 727,470
[22] Filed May 8, 1968
[45] Patented Feb. 23, 1971

[73] Assignee Serck Controls Limited
Queensway, Leamington Spa, England

[54] FREQUENCY SHIFT SIGNAL TRANSMISSION SYSTEMS USING HALF-CYCLES OF FREQUENCY SHIFT OSCILLATOR
8 Claims, 2 Drawing Figs.

[52] U.S. Cl. .......... 178/66, 178/67, 325/30, 325/320
[51] Int. Cl. .......... H04l 27/10
[50] Field of Search .......... 178/66, 66 (A), 67, 88; 325/30, 320, 95, 163; 328/27, 21

[56] References Cited
UNITED STATES PATENTS

| | | | |
|---|---|---|---|
| 3,102,238 | 8/1963 | Bosen | 328/27 |
| 3,223,925 | 12/1965 | Florac, Jr. et al. | 178/66X |
| 3,320,364 | 5/1967 | Steiner et al. | 325/30X |
| 3,325,595 | 6/1967 | Dascotte | 178/67 |
| 3,454,718 | 7/1969 | Perreault | 178/66 |

*Primary Examiner*—Richard Murray
*Assistant Examiner*—Benedict V. Safourek
*Attorney*—Holman & Stern

ABSTRACT: In data transmission system for the transmission of binary coded date a mark is represented by only one-half a cycle of one frequency and a space by only one-half a cycle of another frequency. The receiver is arranged to reorganize the respective frequency from examining each half-cycle.

Figure 1:
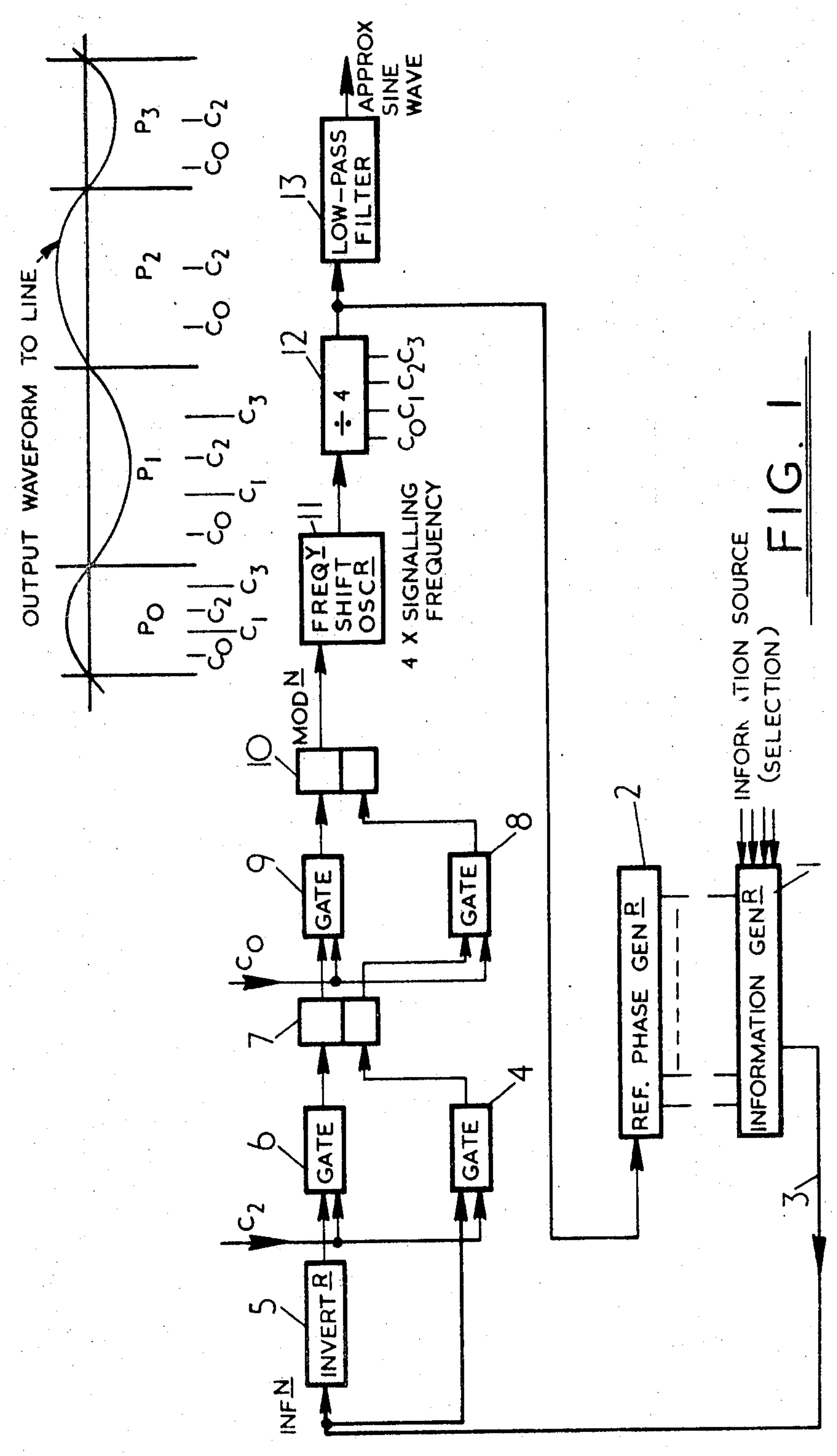

INVENTOR
R. E. YOUNG
BY Glascock, Downing + Seebold
ATTORNEYS

FREQUENCY SHIFT SIGNAL TRANSMISSION SYSTEMS USING HALF-CYCLES OF FREQUENCY SHIFT OSCILLATOR

This invention relates to signal transmission arrangements and in particular to data transmission systems.

In many carrier transmitting systems for the transmission of binary coded data, bursts of carrier frequency indicate the "-marks" and "spaces." The beginning and end of a burst is not related to the instantaneous phase of the carrier frequency so that the leading and trailing edges of the demodulated pulses contain an element of jitter according to the instantaneous phase of the carrier. It has been proposed to use a two-frequency system in which a mark is represented by one frequency and a space by another frequency. In such cases to avoid jitter it was proposed that the modulating signal be an integral number of cycles (for example, one cycle) of the modulated carrier. Such an arrangement increases the transmission speed.

An object of the present invention is to provide an arrangement which further increases the transmission speed.

According to the invention, in a line transmission system, a mark is represented by half a cycle of one frequency and a space by half a cycle of another frequency, the transitions from one frequency to the other taking place at substantially the zero crossover points.

With such an arrangement it is necessary to detect the frequency present from observing only half a cycle of that frequency. This may be ascertained by observing the duration between crossover but errors arise in the presence of waveform distortion. This distortion is envisaged as taking place relative to the crossover axis, and occurs either as phase distortion or as its equivalent, or as the result of break-in by spurious interference signals.

To facilitate the recognition of the half-cycles even in the presence of distortion it is ensured:

i. That in generation for transmission no interruption takes place in the generated waveform with change from "-mark" to "space" and vice versa.
ii. That it is arranged at the sending end that half-cycles of modulated signal begin at zero amplitude (relative to the undistorted cross over axis). This can be achieved by introducing a "signal commencement delay" between the original modulation instruction signal and the beginning of the transmission of the corresponding half-cycle signal. The signal commencement delay is made up of cumulative circuit delay, which is inherent, and an added period adjusted to give the transmitted waveform an initial amplitude of zero.
iii. At the receiving end crossover measurement point, this condition is reestablished so that the half-cycle waveform occupies the same position relative to the crossover axis, effectively in terms of DC levels.

Also in certain circumstances it may be advantageous to choose a special pulse shape, for example, a "sine-squared" form. Such an approach may be considered as keeping the higher frequency components to a minimum by virtue of the "limited spectrum" pulse characteristic.

According to further aspects of the invention, a transmission system includes means at the receiving end for rapid sampling (scanning) of the waveform according to amplitude and thereby comparing the waveform against the possible two predetermined forms. Thus if the scanning is begun (by measuring successive ordinates) as soon as a rise in signal envelope is detected, one of two voltage distribution patterns will be obtained. Thus it should be possible to determine which of the two transmitting "frequencies" had been sent from the relative difference which should be found between the two patterns.

In this arrangement it would be advantageous to use a pure half-sine wave as distinct, say, from a sine-squared pulse. This follows in that the sharper rise time, essentially from zero crossover, should result in a comparatively large measurement value being obtained almost instantaneously.

"Rise" is used here with an algebraic connotation and provision is made to deal with both positive going and negative going waveform amplitudes. It may be treated either as a measurement above and below the crossover axis as zero, or as in one direction relative to a reference axis outside (below for example) the waveform itself.

Further discrimination between the two envelopes may be obtained by making the amplitudes of the one of longer duration proportionally greater than that of the shorter (high frequency) waveform. Since comparison is made from half-cycle to half-cycle conditions producing amplitude changes are assumed not to alter appreciably over such short times.

As an extension of the above arrangement, each set of half-cycle samples (ordinates) may be held in an individual store, and comparison made at each sampling instant between the particular stored sample and the corresponding sample of the incoming half-wave. The total sampling period is made equal to the duration of the high frequency (shorter) waveform.

Two groups of individual stores are required, one holding the samples during comparison, and the other the instantaneous incoming waveform with which the already stored samples are being compared, and which will become the stored half-cycle for the next comparison. To obtain continuous operation, cycling of function is arranged between the two stores, i.e. one particular store will be alternately the incoming waveform stores and then, on the next signal half-cycle the reference-hold store.

As an alternative, a standard sample may be provided, either a. from an accurate oscillator which would run continuously at a frequency corresponding with the shorter waveform, or
b. as a set of stored voltage ordinates, maintained at datum values on individual lines allocated to the sequential sampling points.

Thus for (a), the signal waveforms would have to be stored for comparison which would be started in step with the commencement of the oscillator half-cycle wave; whereas with (b) sampling could be effectively an instantaneous operation.

The storage of the sample may be in analogue or digital form.

With multielement sampling, the comparison result may be produced as the outcome of a majority decision on, say, not less than four samples. This should ensure that extremely short bursts of pulse like or similar noise would be prevented from interfering with accurate identification of the particular waveform.

The above-described arrangements envisage that the distortion present in the transmission line is reasonably constant, i.e. that the line has been equalized. However, equalization usually demands a lengthy period of measurement and setting up whenever the line parameters are changed. Also to carry out conventional equalization procedure it is necessary to gain access to both ends of the link, and to establish an additional form of communication between them.

Where equalization is not possible or desirable it becomes necessary to recognize the two distorted patterns and to provide for immediate adjustment to compensate for changes in line characteristics of substantial magnitude.

In a simpler embodiment of the invention a pilot signal is sent over the line circuit to suffer the same distortion effects as the signals themselves. The pilot signal as received is then used as the reference for comparison and recognition.

The duration of the pilot tone, as seen by the comparison unit, preferably is basically half a cycle, and a waveform preferably made available for each of the two frequencies of the transmitted intelligence signals. This might be reduced to one frequency with comparison being made on a "yes-no" basis. In either case, the pilot signal must be segregated from the intelligence signals. For this to be achieved, the pilot signal and the intelligence signals may be interlaced in some way, e.g. the former sent over the line during intervals between words, or, alternatively, sent over a specific channel in a multilevel system.

The main alternative to pilot tone working is to synthesize at least one, and probably two, waveforms for comparison recognition at the receiving end. These waveforms would have to be sufficiently close to the distorted received signals for unambiguous recognition to be achieved. Again, one waveform would be sufficient for a "yes-no " decision; but added security would be offered by the two distinct references for comparison.

When using equalized or nonequalized lines it may be desirable to provide secondary or confirmatory checks during sampling measurement. For example, differentiation or integration of the signal envelope may be used. The integration method to be effective, requires that the two signal envelopes are of different amplitude and that there is no abrupt changes between successive signals. With the differentiation method it is found, in practice, that there is probably only one point in a half-cycle, particularly if distorted, where a pronounced difference can be detected between the two signal envelopes.

Figure 2:
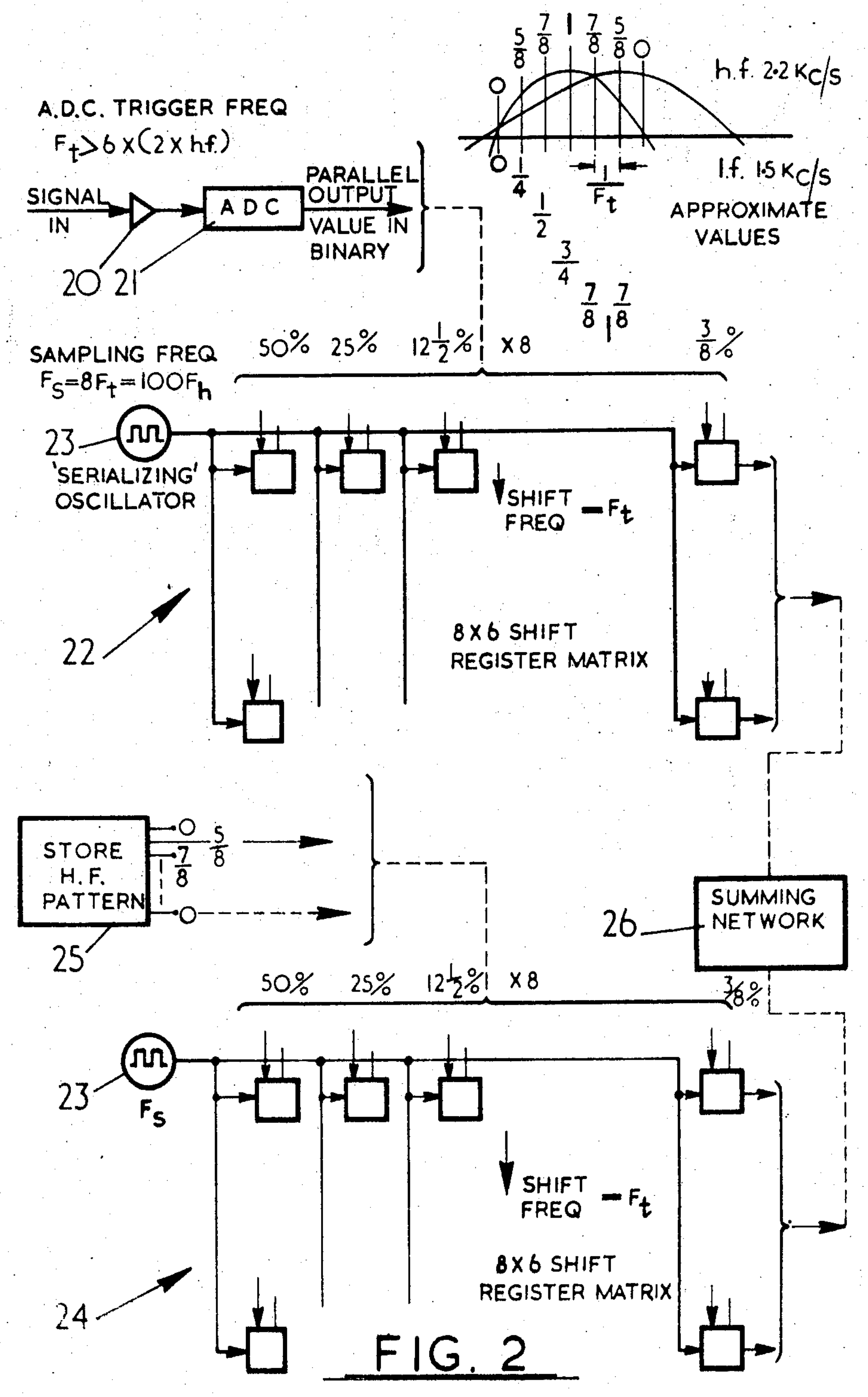

Embodiments of the invention will now be described, by way of example, with reference to the accompanying drawings, in which:

FIG. 1 is a schematic block diagram of a transmitter in accordance with the invention, and FIG. 2 is a schematic block diagram of a receiver in accordance with the invention.

In the transmitter shown in FIG. 1 the digital information to be transmitted is stored temporarily in the information generator 1 which in conjunction with a phase reference generator 2 releases the information serially at half-cycle intervals along line 3 from which it passes on the one hand to gate 4 and on the other to an inverter 5 and a gate 6. The inverter 5 is such that when the information bit is a space a mark output is produced so that a mark is produced at either gate 4 or gate 6 according to whether the information on line 3 is a mark or a space respectively. As common input to the two gates there is a gating pulse $C_2$ which occurs very approximately at the center of each half-cycle so that the appropriate gate 4 or 6 provides an output which is fed to the appropriate side of a store 7 which may be a bistable trigger circuit. The store provides an output at the input of gate 8 or 9 according to whether the original information on line 3 was a mark or a space. As a common input to both gates 8 and 9 there is a timing pulse $C_o$ which releases an output from the appropriate gate at the correct moment which, with the time delays in the circuit, will cause modulator 10 to change the frequency of frequency shift oscillator 11 at a zero crossover point so that a smooth transition takes place. Oscillator 11 may comprise cross coupled transistors with appropriate time constants which include resistors which are shunted by further transistors so that rendering the appropriate ones of the further transistors conductive, short circuits one or more resistors thereby shifting the frequency of the oscillator.

The oscillator 11 runs at four times the signalling frequency and the output is divided by four in divider 12 to provide the required signal output which is fed to the phase reference generator 2 and through a low pass filter 13 to provide an approximately sinusoidal waveform output such as is shown in the inset waveform diagram which represent digital information 1001.

Divider 12 also produces the timing pulses $C_o$, $C_1$, $C_2$ and $C_3$, and this is the reason for the oscillator running at four times signalling frequency. Only pulses $C_o$ and $C_2$ have been shown in use in the arrangement of FIG. 1 and the choice is determined by the expected distribution of distortion and of delay effects. Other combination of the four timing pulses may be employed for gating to meet conditions such as line loading encountered in practice.

Referring to FIG. 2, the input signal is fed via a buffer amplifier 20 to an analogue-digital converter 21 in which each half-cycle of the input signal is sampled six times at intervals $1/Ft$, where $Ft$ is 12 times the frequency of the high frequency (h.f.) signal which is assumed in this embodiment to be 2.2 kH$_z$., the low frequency (l.f.) signal being 1.5 kH$_z$. The inset waveform diagram shows the sampling intervals, the fractions shown above and below the waveforms indicating the relative analogue values of the signal amplitude for the h.f and l.f. respectively at the sampling point. To convert the analogue value to digital form the converter in known manner indicates whether each sample is above 50 percent of the maximum amplitude, then whether the remainder is a half of a half, then whether the remainder is a half of a quarter and so on, to produce eight bits corresponding to each sample value. The binary encoded signals are fed out on parallel "readout" lines to a shift register matrix 22 of which the eight columns are arranged in significant order of the binary bit representation of the sample amplitudes and the six rows contain the binary values of the six sample amplitudes. As in normal operation of a shift register matrix the binary bits of the first sample are stored in the top row and then as each next sample is entered the information already in the matrix is moved down the matrix one row until the matrix is full.

The operation of the matrix is controlled by a "serializing" oscillator 23 of frequency $F_s$, where $F_s$ is eight times the sampling frequency $F_t$, i.e. about 100 times the h.f. frequency.

Whilst the matrix 22 is being filled, a similar matrix 24 is filled from a store 25 which contains the binary values of six corresponding samples of the h.f. pattern. When the two matrices are full both matrices are read-out horizontally so that the bits of similar significance of each sample from each matrix are fed to a summing network 26 where a comparison takes place. If all or a sufficient number of comparison agreements are obtained than the signal represented in matrix 22 is an h.f. signal but if insufficient agreement are obtained then the signal represented in matrix 22 is an l.f. signal. Where a majority decision is required a threshold detector is employed following the summing network 26, which detector conveniently is a resistor-transistor logic network of AND gate configuration.

Where interference or distortion is high it may be desirable to make two comparisons, one against an h.f. sample as described and the other against a l.f. sample in a like manner so that complementary "yes" and "no" decisions are given on each signal element. With such an arrangement, suitable combinations of checking can be covered to deal with various kinds of interference. For example, the decoded "mark/space' ' signals can be taken from the h.f. pattern comparison, and the sampling on the l.f. pattern used for the detection and assessment of interference, possible in terms of amplitude and frequency. The results of this assessment could either be used for adaptive control to change the mode of operation, e.g. for change from an overall "yes—no" determination to majority decision working, or for accumulation of operational data, all in terms of the distribution of the interference.

Similarly, with only one of the two pattern comparisons being used for actual signal detection (both available), choice could be made of the pattern as stored which would "see" the less distorted incoming half-cycle signal. Also, where equalization or its equivalent was changed, and a corresponding alteration made in the stored "working" pattern, the stand-by pattern would be retained unchanged and remain as a reference, particularly where nonequalized working was adopted. In this context it might be found preferable to derive any triggering waveform "edges"—for driving synthesizing generators for instance—from the unchanged stand by pattern subsystem.

In an alternative arrangement the analogue—digital converter is replaced by an analogue—frequency converter, the output of which is fed into a conventional double—tuned circuit frequency discriminator to give the "slope" (differential) of the signal waveform in magnitude and sign. This would be a continuous function obtained in a comparatively simple manner and could be handled in a variety of ways, e.g. by sampling, and would give shape with a known time—base.

I claim:

1. A data transmission system for the asynchronous transmission of binary coded data from a data source, comprising means for determining whether each bit of data from the data source is a mark or a space, a frequency shift oscillator, means for smoothly changing the frequency of said oscillator between two predetermined frequencies to provide an output wherein each mark of data is represented by a half-cycle of one of said frequencies and each space of data is represented by a half-cycle of the other of said frequencies, and means for storing and releasing the data to the frequency change means in timed relationship so that the transition from one said frequency to the other said frequency taking place at substantially the zero crossover point.

2. A data transmission system as claimed in claim 1, wherein at the receiving end there are provided means for rapid sampling according to the amplitude of the incoming waveform of the oscillator output, store means for storing previously obtained rapid sampling amplitude values of one or both half-cycles of the two frequencies of the oscillator and means for comparing the samples of the incoming waveform against the store samples to determine from which said frequency each half-cycle of the incoming waveform was derived.

3. A system as claimed in claim 2, wherein means is provided to convert the samples of the incoming waveform into digital form and feed said digital form to a shift register matrix and means is provided for reading the digital form together with the store sample in digital form to a comparison device to determine whether the incoming digital form corresponds or not with the stored digital form.

A system claim 2 wherein where comparison is made against only one of the predetermined forms, this form is that corresponding to the higher frequency.

5. A system as claimed in claim 3 wherein the stored samples of digital form are transferred to a shift matrix before being fed to the comparison device.

6. A system as claimed in claim 2 wherein the samples of the previous incoming signal are passed to the store to become the store samples during the next comparison.

7. A system as claimed in claim 1 wherein the means for determining whether each bit is a mark or a space comprises a gate and an inverter—gate combination to both of which the bits are fed, the gates being controlled by common gating pulses timed to occur at approximately the center of the bit period.

8. A system as claimed in claim 1 wherein the frequency shift oscillator runs at a frequency which is an integer of the signalling frequency and the oscillator frequency is divided by this same integer to enable timing pulses to be obtained.